US012544770B2

(12) United States Patent
Messineo et al.

(10) Patent No.: US 12,544,770 B2
(45) Date of Patent: Feb. 10, 2026

(54) METHOD AND APPARATUS FOR CLEANING AN ELECTROSTATIC PRECIPITATOR GAS SCRUBBING APPARATUS

(71) Applicant: Exentec U.S., Inc., Milpitas, CA (US)

(72) Inventors: Daniel L. Messineo, Fremont, CA (US); Husain Lohawala, Sunnyvale, CA (US); Mark W. Johnsgard, Aptos, CA (US)

(73) Assignee: Exentec U.S., Inc., Milpitas, CA (US)

( * ) Notice: Subject to any disclaimer, the term of this patent is extended or adjusted under 35 U.S.C. 154(b) by 558 days.

(21) Appl. No.: 17/819,091

(22) Filed: Aug. 11, 2022

(65) Prior Publication Data

US 2023/0045866 A1 Feb. 16, 2023

Related U.S. Application Data

(60) Provisional application No. 63/232,534, filed on Aug. 12, 2021.

(51) Int. Cl.
*B03C 3/16* (2006.01)
*B03C 3/40* (2006.01)

(52) U.S. Cl.
CPC . *B03C 3/16* (2013.01); *B03C 3/40* (2013.01)

(58) Field of Classification Search
CPC .... B03C 3/74; B03C 3/78; B03C 3/53; B03C 3/16; B03C 3/68; B03C 3/746; B03C 3/763; B03C 3/49; B03C 3/86; B03C 3/82; B03C 2201/12; B03C 2201/28; B03C 2201/24; B03C 2201/04; B03C 2201/06; B03C 2201/08; B03C 2201/10
See application file for complete search history.

(56) References Cited

U.S. PATENT DOCUMENTS 1,905,993 A * 4/1933 Carl .......................... B03C 3/014 96/48
4,294,591 A * 10/1981 Kahl .......................... B03C 3/70 96/88
4,700,014 A * 10/1987 Joy .......................... H01B 17/52 174/31 R
5,421,863 A * 6/1995 Rector .......................... B03C 3/12 96/60

(Continued)

*Primary Examiner* — Jennifer Dieterle
*Assistant Examiner* — Sonji Turner
(74) *Attorney, Agent, or Firm* — Hodgson Russ LLP

(57) ABSTRACT

An electrode for use in an electrostatic precipitator comprising a conductive central portion to which are attached a plurality of conductive disc-shaped elements each having sharp points spaced around its circumference and a plurality of openings near its center. The central portion passes through the centers of each thus locating them parallel to one another along the central portion. The disc-shaped elements are conical or convex in shape, and oriented with their rims raised above their centers so that any water that collects on them runs out through the openings and down the central portion of the electrode thus reducing or eliminating arcing between the electrode and a collector in the electrostatic precipitator. A high voltage feedthrough and the electrode assembly are configured as one contiguous chamber with holes around the interior walls of the high voltage feedthrough to alternately receive liquid and gas.

6 Claims, 10 Drawing Sheets

(56) References Cited

U.S. PATENT DOCUMENTS

| | | | | | |
|---|---|---|---|---|---|
| 6,106,592 | A * | 8/2000 | Paranjpe | B03C 3/16 | 95/71 |
| 6,365,112 | B1 * | 4/2002 | Babko-Malyi | B01D 53/323 | 422/186.04 |
| 7,767,150 | B1 * | 8/2010 | Zaromb | G01N 1/2202 | 422/400 |
| 8,039,765 | B2 * | 10/2011 | Bologa | B03C 3/36 | 439/98 |
| 8,337,600 | B2 * | 12/2012 | Paur | B03C 3/41 | 96/96 |
| 8,419,841 | B2 * | 4/2013 | Tanaka | A61L 9/22 | 96/88 |
| 10,814,336 | B2 * | 10/2020 | Voronin | B03C 3/80 | |
| 10,864,526 | B2 * | 12/2020 | Johnsgard | B03C 3/017 | |
| 10,890,113 | B2 * | 1/2021 | Jaasund | F01K 25/065 | |
| 2018/0071751 | A1 * | 3/2018 | Voronin | B03C 3/01 | |
| 2018/0318845 | A1 * | 11/2018 | Johnsgard | B03C 3/49 | |
| 2019/0001346 | A1 * | 1/2019 | Wiesenberg | B03C 3/41 | |

* cited by examiner

500

800

METHOD AND APPARATUS FOR CLEANING AN ELECTROSTATIC PRECIPITATOR GAS SCRUBBING APPARATUS

This application claims priority to Provisional Application No. 63/232,534, filed Aug. 12, 2021, which is incorporated by reference herein in its entirety.

FIELD OF THE INVENTION

The present invention relates generally to an electrostatic precipitator in a gas scrubbing apparatus and more specifically to maintaining the cleanliness of such an electrostatic precipitator.

BACKGROUND OF THE INVENTION

A variety of industrial processes create gas streams that must be scrubbed of contaminants before being released to the outside world. The manufacture of electronics, solar cells, display devices, communications devices, metals, ceramics, and polymers, as well as the processing of chemicals, drugs, and other materials, often requires the use of exhaust gas scrubbers. Scrubbers typically receive a substantially gaseous exhaust stream (sometimes containing fine particles or fine mists) and remove contaminants from the stream before the stream is released to the environment.

Exhaust streams from electronic fabrication processes may include a variety of contaminants, including but not limited to perfluorocarbon (PFC) etch gases such as SF6, NF3, CF4, C2F6, C4F8, COF2, and C4F6. Exhaust streams may also include toxic hydrides such as AsH3, PH3, P2H4, or B2H6, pyrophoric or flammable gases such as SiH4, H2, Si2H6, GeH4, and/or gases such as WF6, SiF4, HCl, BCl3, C12, TiCl4, F2, HF, and various chlorosilanes. Other industrial processes may also create toxic or polluting exhaust streams particular to a specific material or manufacturing process.

In such processes, a proportion of the gas supplied to the chamber may be exhausted from the chamber, together with solid and gaseous by-products from the process occurring within the chamber. Further, a process tool may have a plurality of process chambers, each of which may be at respective different stage in a deposition, etching or cleaning process. Therefore, during processing a waste stream may be formed from a combination of the gases exhausted from the chambers that may have various different chemical or particulate compositions.

Thus, before the waste stream is vented into the atmosphere, it is typically treated to remove selected gases and solid particles therefrom. Acid gases such as HF and HCl are often soluble in water, and are commonly removed from a gas stream using a wet scrubber, for example, a packed tower scrubber, in which the acid gases are taken into solution by a scrubbing liquid flowing through the scrubber. Some contaminants are water-reactive, and may or may not dissolve in water, depending upon various conditions. These contaminants may also react with water to form solid reaction products.

Some contaminants are often abated by using heat to break down or combust the contaminant to form water-soluble reaction products. Sometimes, this requires high temperatures. For example, NF3 may be combusted at temperatures above 900 degrees Celsius; CF4 may be broken down at temperatures over 1200 degrees Celsius. Other contaminants such as SiH4 may sometimes be combusted simply by exposing the contaminant to an oxygen source.

The water-insoluble, thermally decomposed contaminants may form reaction products (e.g., HF) that may then be removed by wet scrubbing the reacted gas stream. Other water-insoluble contaminants (e.g., SiH4) may form reaction products that include solid species (e.g., SiO2), when thermally reacted.

Generally, such solid species in a waste stream may be present as fine particles in a liquid phase (e.g., water associated with a scrubber), in the gas phase, deposited on a solid surface, or in other ways. These solid species may also nucleate directly on various surfaces. While the formation of solid reaction products may enable certain removal methods (e.g., filtration), these species may also deposit on and clog various lines, inlets, passages, surfaces, and other aspects of the system, reducing the system's efficiency or stopping its operation.

For gas streams including a variety of contaminants, effective scrubbing may require multiple systems, such as a wet scrubber to remove water-soluble contaminants combined with a combustion chamber to combust water-insoluble contaminants. Even such a combination may not be able to remove all of the particles from a gas stream, particular those under a certain size.

In view of this, it is known to provide an electrostatic precipitator downstream from the wet scrubber and/or combustion chamber to remove these smaller particles from the waste stream. An electrostatic precipitator typically involves injecting a gas stream from which particulates are to be removed and water mist into a space between two electrodes (the second electrode is sometimes referred to as a collector). However, in some prior art electrostatic precipitators, some electrode configurations can result in water mist collecting on an electrode such that there is undesirable arcing between the electrodes and/or between other elements in the electrostatic precipitator.

Accordingly, it would be useful to have an improved electrode configuration that prevents water from collecting and causing arcing in an electrostatic precipitator. It would be further useful to have an improved electrostatic precipitator configuration that prevents surface buildup of particles.

SUMMARY OF THE INVENTION

An improved electrode for use in an electrostatic precipitator is disclosed.

One embodiment discloses an electrostatic precipitator including an electrode assembly, comprising; an upper region configured to receive a high voltage feedthrough for the electrode assembly; a lower region configured to operate as the electrostatic precipitator; wherein the upper region and the lower region are configured as one contiguous volume without physical separation; and, wherein an interior wall of the upper region has multiple openings configured to alternately receive a gas and a liquid.

In a further embodiment, the electrode assembly, wherein the multiple openings configured to alternately receive a gas and a liquid, is performed by: turning off the electrode assembly, feeding a liquid through the multiple openings for a first predetermined period of time, feeding a gas through the chamber walls for a second predetermined period of time, turning on the electrode assembly, and repeating these steps.

DETAILED DESCRIPTION OF THE INVENTION

An improved electrode for use in an electrostatic precipitator is disclosed. In one embodiment, the electrode comprises a generally rod-shaped conductive central portion, to which are attached a plurality of conductive disc-shaped elements. Each disc-shaped element has a number of sharp points spaced around its circumference and a plurality of openings near its center. The central portion of the electrode passes through the centers of each of the plurality of disc-shaped elements such that the disc-shaped elements are located parallel to one another along the central portion, and may be equally spaced along the central portion. The disc-shaped elements are conical or convex in shape, and oriented with their rims raised above their centers so that any water that collects on them runs toward the center of the disc-shaped elements and out through the openings and down the central portion of the electrode.

In another embodiment, as discussed further below, there is no barrier between an upper chamber of the electrostatic precipitator through which a high voltage power supply passes and the lower area of the electrostatic precipitator containing the conductive disc-shaped elements. In a still further embodiment, holes are located around the periphery of this upper chamber to alternately receive a liquid, to clean the upper chamber, and a gas, to dry the upper chamber.

As noted above, in some prior art electrostatic precipitators, some electrode configurations have disc shaped elements or other shapes that may result in water mist collecting on the electrode. Such collection of water mist can result in arcing between the electrode and the collector (i.e., the second electrode). The increased current that accompanies arcing may cause damage to the high-voltage power supply or other components, and also momentarily reduces operating voltage and thus the particle removal efficiency. It is thus preferable to prevent such arcing if possible.

The present configuration significantly ameliorates this problem since any water mist that collects on a disc shaped element will collect at the bottom of the disc shaped element and run out of one or more of the openings at the bottom of the disc shaped element and down the central portion of the electrode, where it can be drained off without arcing. In the absence of any collected water mist at the edges of disc shaped elements, the chance of arcing between the electrode and the collector is eliminated or at least greatly reduced.

Figure 1:
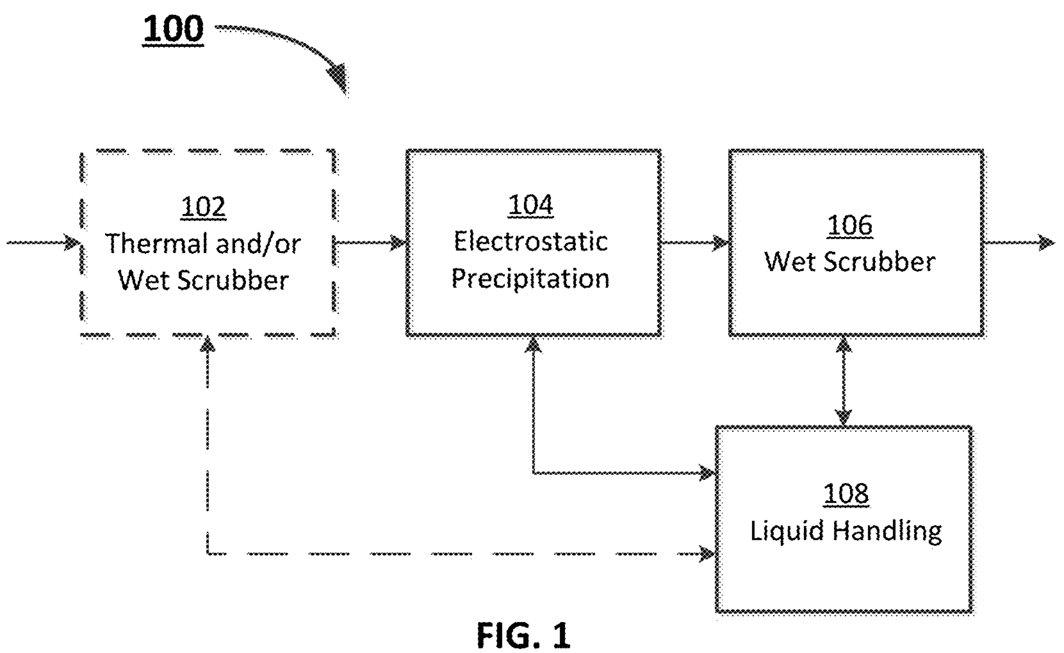
FIG. 1 is a diagrammatic representation of an exemplary system that may be used to perform a multi-step abatement process, according to some embodiments.

As above, one of skill in the art will appreciate that an electrostatic precipitator may be only one part of an abatement system for treating a gas stream containing various contaminants. FIG. 1 is a diagrammatic representation of one exemplary system that may be used to perform a multi-step abatement process, according to some embodiments. Such a system may be particularly useful for abating a mixed-contaminant gas stream, particularly a stream comprising mixtures of water-soluble, water-reactive, and/or water-insoluble contaminants. Abatement system 100 includes an optional thermal burner system and/or wet scrubber 102, an electrostatic precipitation system 104, a wet scrubber 106, and a liquid handling system 108. In other embodiments, the order of the various systems may be altered; for example, in some embodiments it may be desirable to have the gas stream pass through an electrostatic precipitation system first in order to capture excessive dusts and mists resulting from the manufacturing process in use.

Generally, exhaust gas streams may flow through abatement system 100 from left to right as shown. An exhaust gas stream may first be scrubbed of water reactive and/or water-soluble contaminants in a burner system and/or wet scrubber 102. It may be advantageous to use a wet scrubber that removes as many water reactive and/or water-soluble contaminants from the gas stream as possible, as their removal prior to subsequent reaction systems may improve performance of those systems.

The scrubbed gas stream may then be treated in electrostatic precipitation system 104. Generally, electrostatic precipitation system 104 may be used to remove many of the remaining contaminants from the scrubbed gas stream as further described below. The reacted gas stream may then pass to wet scrubber 106. In this example, there may be separate wet scrubbers 102 and 106, although the system may be designed such that a single wet scrubber is used.

For embodiments in which abatement system 100 includes such elements as electrostatic precipitation system 104 and one or more wet scrubbers, substantial amounts of liquid may be needed. In such cases, it may be advantageous to include a separate liquid handling system 108. Liquid handling system 108 may provide liquids to any of wet scrubbers 102 and/or 106 and electrostatic precipitation system 104, as well as handle liquids received from these systems.

As an example, U.S. Pat. No. 8,888,900 shows one embodiment of an abatement system in which a wet scrubber is followed by an electrostatic precipitator.

Figure 2:
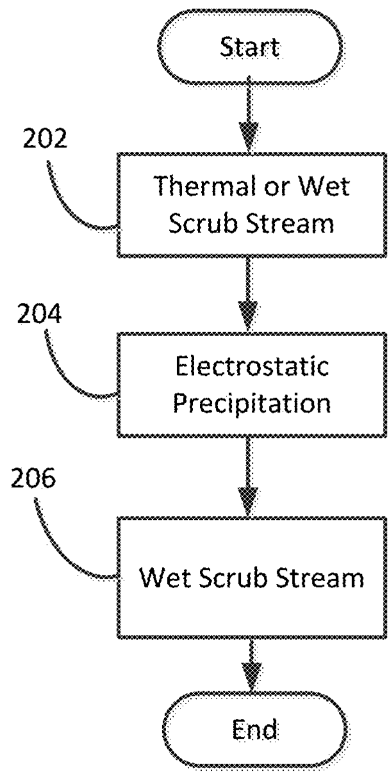
FIG. 2 illustrates several steps in an abatement process according to some embodiments.

FIG. 2 illustrates several steps in an abatement process according to certain embodiments. Some gas streams may be treated by combining several types of abatement apparatus in series and passing the gas stream through each one sequentially. In step 202, a wet scrubber substantially removes water-soluble and/or reactive contaminants from the gas stream. In a preferred embodiment wet scrubber thoroughly scrubs the gas stream (i.e., removes at least 90%, 99%, 99.9%, 99.99%, or even 99.999% of the water-soluble contaminants from the gas stream). In step 204, the scrubbed gas stream is reacted in a reaction system to remove at least a portion of the remaining contaminants. Reaction system 100 may be used for such a step, although other systems capable of reacting such contaminants may also be used. Various embodiments include a reaction system other than reaction system 100, and the use of such systems may be improved when the gas stream has been thoroughly scrubbed of water-soluble contaminants prior to reaction. In step 206, the reacted gas stream is introduced into a wet scrubber (which may be the same or different as the wet scrubber used in step 202). In step 206, the reacted gas stream may be scrubbed of water-soluble reaction products resulting from the reactions of step 204.

Figure 3A:
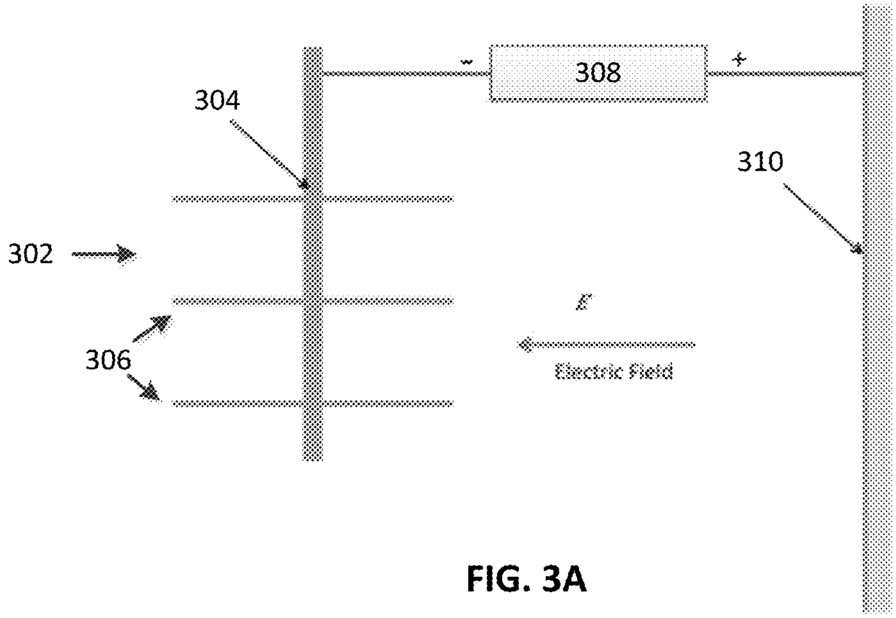
FIGS. 3A to 3D illustrate the general operation of an electrostatic precipitation process according to some embodiments.

FIGS. 3A to 3D illustrate the typical operation of an electrostatic precipitator. FIG. 3A shows the basic components of the electrostatic precipitator. A first electrode 302 includes a longitudinal rod-shaped central portion 304, which connects a plurality of disc shaped elements 306; in some embodiments the spacing between disc shaped elements 306 will be regular, as illustrated, while in other embodiments the spacing may be irregular. As illustrated herein, longitudinal central portion 304 is generally cylindrical, i.e., has a generally circular cross-section, but in some embodiments may have a cross-section that is oval, ovoid, triangular, rectilinear, or even irregular in shape. All such shapes are within the meaning of "rod-shaped" as that term is used herein.

One end of a high-voltage power supply 308 is connected to the first electrode 302, while the other end of power supply 308 is connected to a second electrode (or collector) 310 (with ground return pathways to the power supply if desired), such that an electric field is created in the space between the two electrodes 302 and 310. One of skill in the art will appreciate that acceptable electrode voltages depend upon the spacing between the electrodes, i.e., between the first electrode and the collector. A range of 5,000 to 15,000 volts per centimeter of distance between the electrodes may result in good particle abatement without arcing. As illustrated in FIG. 3A, the negative terminal of power supply 308 is preferably connected to first electrode 302 so that first electrode 302 is a source of electrons, and the positive terminal of power supply 308 is connected to second electrode 310, with the resulting direction of the electric field as shown.

Figure 3B:
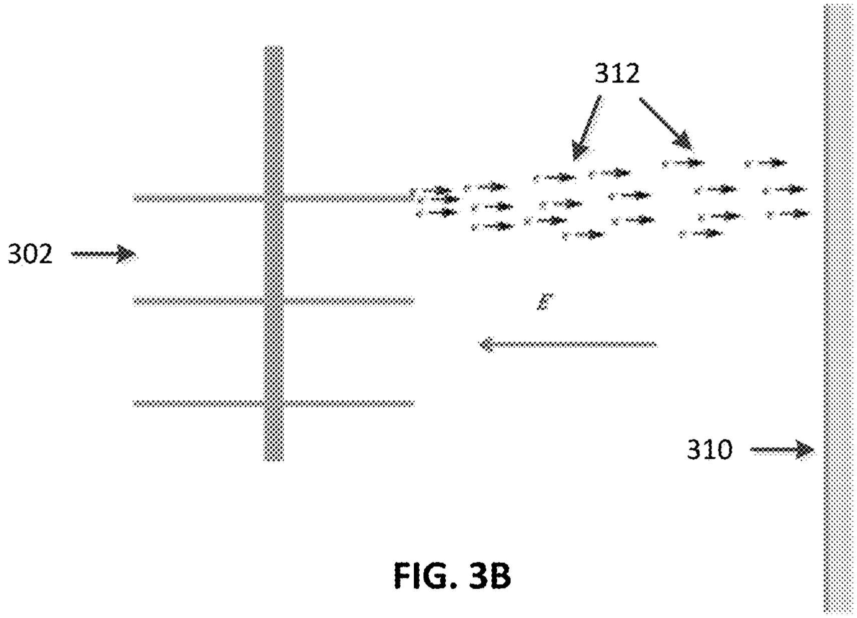

As shown in FIG. 3B, the voltage applied to the electrodes 302 and 310 causes electrons 312 to be ejected from the disc shaped elements 306 on first electrode 302 (particularly from sharp points on the disc shaped elements 306, if such points are present as described below) and to be pushed across to second electrode 310 by the electric field.

Figure 3C:
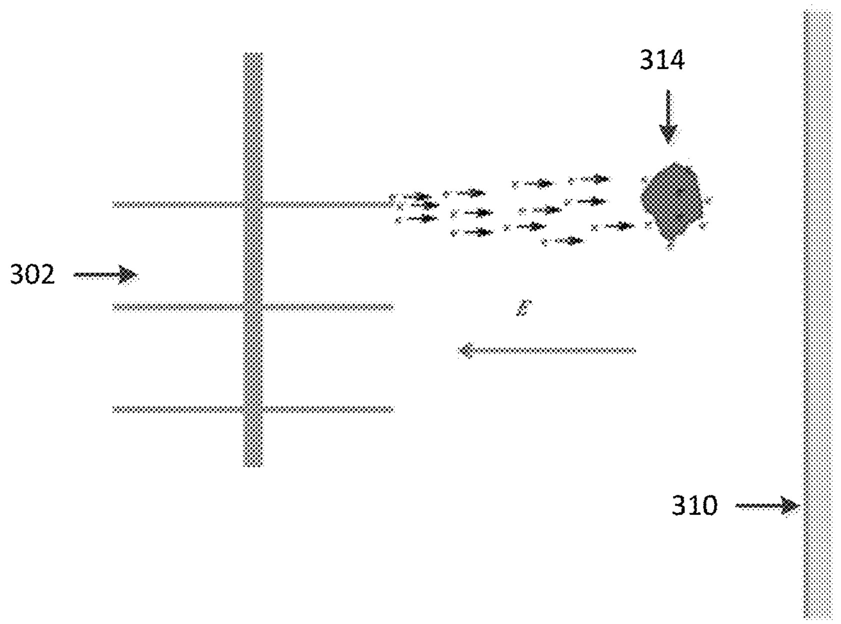

Some of the electrons 312 passing from the disc shaped elements 306 on first electrode 302 to second electrode 310 will strike particles in the gas stream, such as particle 314 as shown in FIG. 3C. Some of the electrons 312 will stick to the particles, giving each such particle a net negative charge.

Figure 3D:
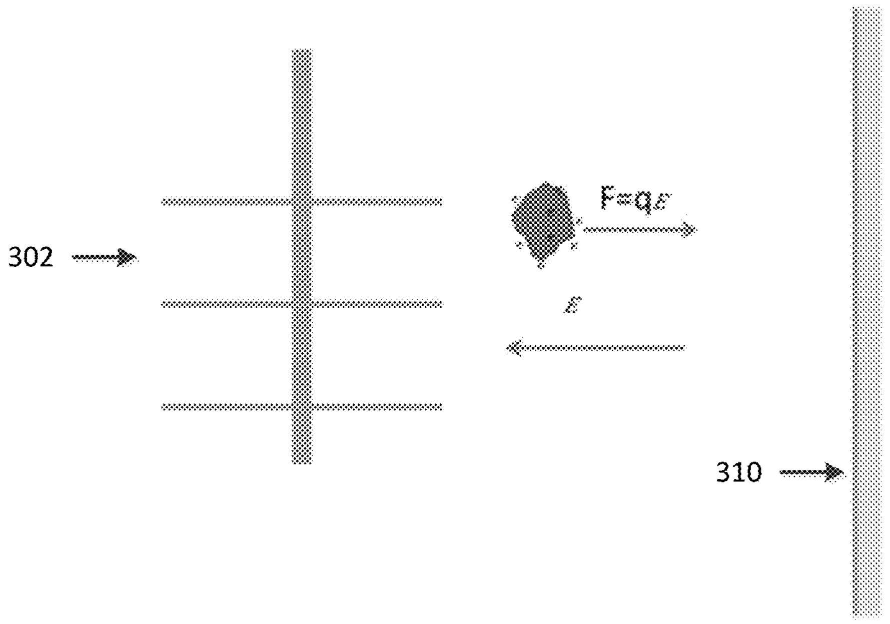

As illustrated in FIG. 3D, the electric field will then exert a force on the now charged particles. The force F on a specific particle is equal to the electric field intensity E times the charge q on that particle. As illustrated here, q is negative, hence the force is in the direction opposite to the field, and toward the electrode or collector 310.

In a wet electrostatic precipitator, the second electrode, or collector, is typically continuously washed with a flow of water. Once the charged particle 314 reaches second electrode 310, the particle 314 is thus washed down to the bottom of second electrode 310 and can then flow out of the electrostatic precipitator.

Figure 4:
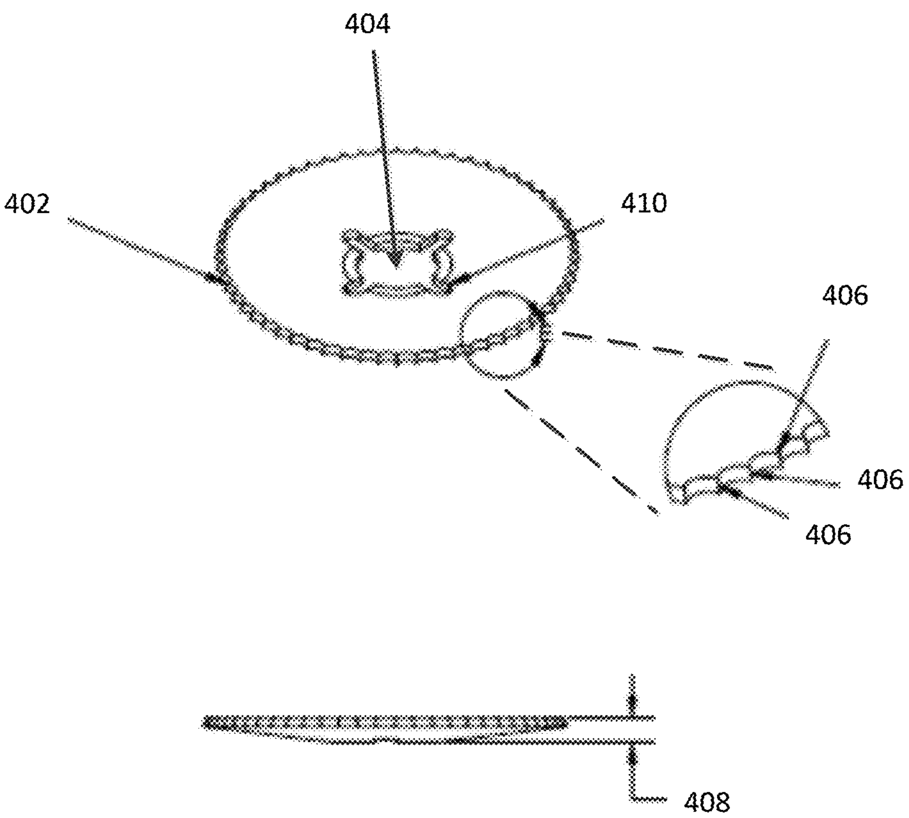
FIG. 4 illustrates a portion of an electrode that may be used in an electrostatic precipitation process according to one embodiment.

FIG. 4 shows a more detailed view of one embodiment of a disc shaped element that may be part of an electrode in an electrostatic precipitator, such as each of disc shaped elements 306 of electrode 302 in FIG. 3A. As illustrated in FIG. 4, the electrode element 402 is disc shaped with a central hole 404 having a circular main portion through which the central portion of a rod shaped electrode, such as longitudinal central portion 304 of electrode 302 in FIG. 3A, will fit. Central hole 404 is here shown as being circular, thus corresponding to a central portion 304 of electrode 302 that has a circular cross-section. It will be appreciated that in other embodiments in which the cross-section of central portion 304 of electrode 302 is not circular, central hole 404 should correspond to the actual cross-section of central portion 304 of electrode 302.

As further shown in FIG. 4, electrode element 402 has a plurality of sharp points 406 spaced around its outer diameter so as to better allow for the ejection of electrons toward the second electrode as described above. In FIG. 4 the points 406 result from a "scalloped" shape having curved indentations in the rim of electrode element 402. However, one of skill in the art will appreciate that any shape resulting in points may be used; for example, in some embodiments the points may be triangular projections from the rim of electrode element 402.

As also shown in FIG. 4, electrode element 402 is slightly concave, conical or "bowl shaped" so as to have a depth 408 between the rim and the center of electrode element 402. In some embodiments, the rim of electrode element 402 is higher than the center by more than 0.05 inches for every inch of radius of electrode element 402, which should be sufficient to cause any collected water to run toward the center of electrode element 402 and prevent the water from dripping off of the rim of electrode element 402 and possibly producing an arc. One of skill in the art will appreciate that other shapes that satisfy the purpose of causing collected water to run to the center of the electrode element 402 may also be used.

Central hole 404 also has a plurality of openings 410 around the circular main portion of central hole 404, so that when the disc shaped electrode is mounted on a central portion of an electrode as in FIG. 3A, these openings are not blocked by the central portion of the electrode. As illustrated in FIG. 4, these openings 410 are slots that extend from the central hole 404 in electrode element 402. Alternatively, there may be extensions of central hole 404 that are shapes other than slots 410, or even holes in electrode element 402 that are separate from, but near, central hole 404. All of these alternatives are included within the meaning of "openings" in electrode element 402 as that term is used herein.

When attached to the central portion of an electrode, the rim of electrode element 402 should be toward the top of the electrostatic precipitator and the center of electrode element 402 toward the bottom of the electrostatic precipitator. This allows fluid from the water mist that collects on electrode element 402 to run to the center of electrode element 402 where it can drain through one or more of the openings 410, and down the central portion of the electrode. As above, this prevents collected water from collecting on or dripping off the rim of electrode element 402, greatly reducing or eliminating arcing, and also allows the collected water to actively rinse the electrode, slowing deposition of any particles on the electrode and removing any previously accumulated matter.

In some embodiments, as is known in the art, the electrostatic precipitator may be contained in a vertically oriented generally tubular container, in which first electrode 302 extends down the longitudinal axis of the container, and second electrode 310 is the inner wall of the container. As above, second electrode 310 will be continuously washed with a flow of water.

As shown herein, the tubular container is cylindrical, and thus has a circular cross-section. In other embodiments, the tubular shape may have an oval, ovoid, or rectilinear cross-section, or even an irregularly shaped cross-section. Those of skill in the art, in light of the teachings herein, will appreciate the issues that may arise with such other shapes and the implementation variations required for such other shapes.

When a different treatment method is used before an electrostatic precipitator, the prior treatment method and resulting products may cause certain design decisions to be more desirable. For example, in some embodiments water from a wet scrubber may be used as the flow of water over the second electrode. In some cases, this fluid may contain acids such as HF or HCl, having a pH value less than 1 and thus being corrosive. In such cases the body of the electrostatic precipitator may be made of a corrosion resistant plastic such as PVC, and the water used to flush the collection surface used as the conductor of the second electrode.

As above, it is known to treat a gas stream with a wet scrubber before further treatment with an electrostatic precipitator. In a different embodiment described herein, the sequence is reversed, with treatment of a gas by the electrostatic precipitator prior to treatment by the wet scrubber. The electrostatic precipitator may use the improved electrode described above.

Figure 5:
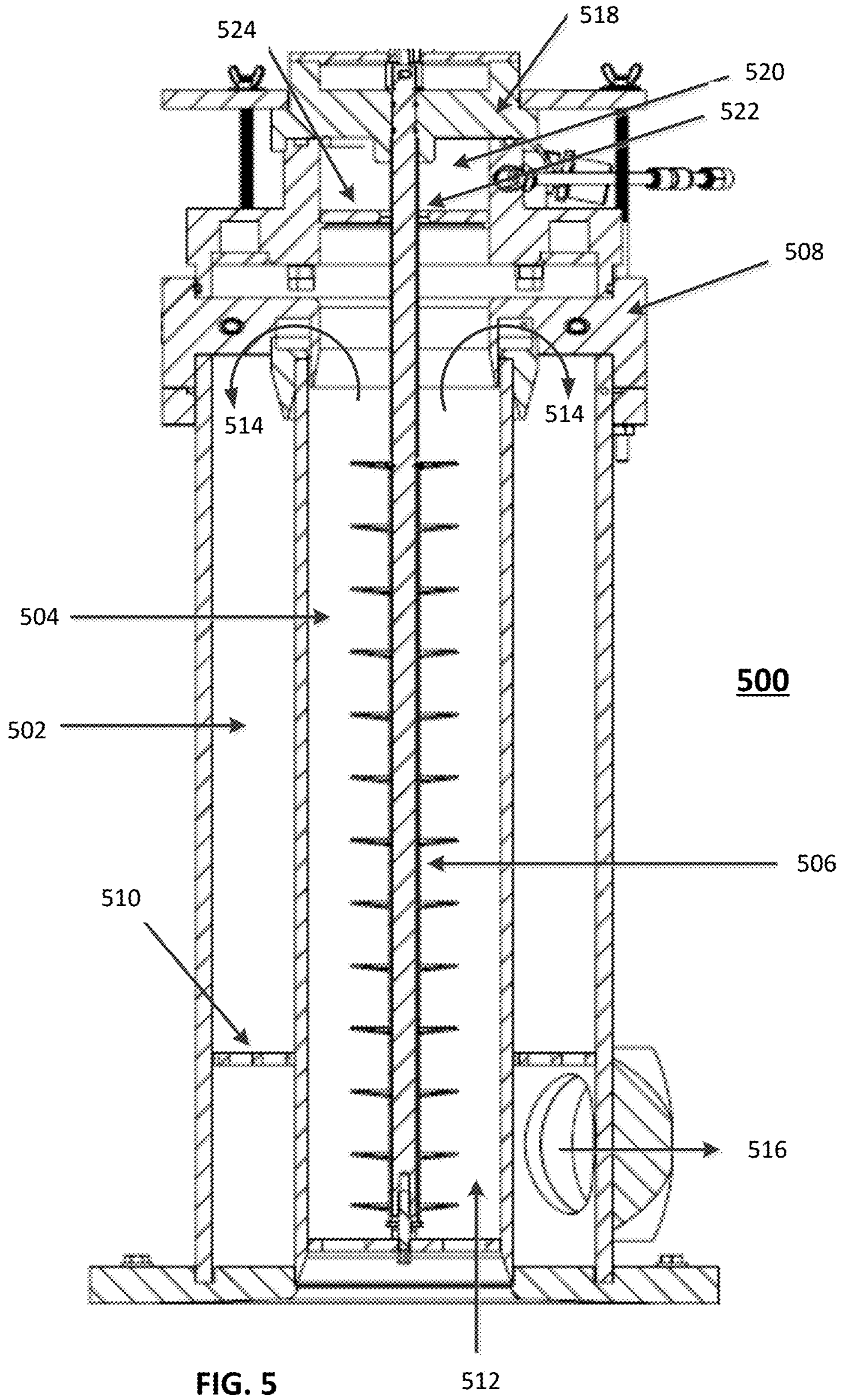
FIG. 5 is a cross-sectional view of an abatement apparatus including an electrostatic precipitator and a wet scrubber according to one embodiment.

FIG. 5 is a cross-sectional view of an abatement apparatus 500 including an electrostatic precipitator and a wet scrubber according to one embodiment. The abatement apparatus 500 includes a packed column wet scrubber 502 located concentric to a central electrostatic precipitator 504, i.e., the precipitator is located in a central column/tube and the scrubber is in a surrounding column or tube, such that the outside wall of the electrostatic precipitator 504 is the inner wall of column scrubber 502. In one embodiment, the first electrode 506 of the electrostatic precipitator 504 is the electrode described above, i.e., an electrode such as electrode 302 of FIG. 3A with a plurality of disc shaped elements such as disc shaped elements 306 of FIG. 3A, each of which may be configured such as shown by element 402 of FIG. 4.

As shown by arrow 512, a gas stream, for example, from a burn chamber (not shown) moves upwards through a sump-supplied, recirculating water spray in the central collection tube of electrostatic precipitator 504 and into a sump-supplied, recirculating water feed ring 508 at the top of the apparatus 500. Here, as shown by arrow 514, the gas stream reverses direction and flows downwards through fresh water wash packing in the wet scrubber 502 that encircles or surrounds the core assembly of electrostatic precipitator 504. The gas stream then passes through a packing stop 510 at the bottom of the packed column and, as shown by arrow 516, exits through a removable flanged exhaust to a facility exhaust system.

In some embodiments, the electrostatic precipitator 504 of apparatus 500 may only receive sump-supplied, recirculating water while the wet scrubber 502 may only receive a supply of fresh water. These two different water sources may be physically separate such that the respective liquids are never combined in apparatus 500. As above, the electrostatic precipitator 504 is located concentric to the wet scrubber 502 in apparatus 500, with neither being physically located above the other.

In some embodiments, the connection from the high voltage power supply 518 to the electrostatic precipitator electrode 506, referring to herein as a high voltage feed-through, may pass through a chamber 520 which is filled with an inert gas, such as nitrogen, or clean dry air. The gas or clean dry air in the chamber 520 is at a higher pressure than gas in the electrostatic precipitator. A small opening is provided between chamber 520 and the top of the electrostatic precipitator, and the pressure difference between the gas or clean dry air in chamber 520 and gas in the electrostatic precipitator allows the gas or clean dry air to flow only from chamber 520 into the electrostatic precipitator, thus preventing the accumulation of water and/or particles on the connection from high voltage power supply 518.

As above, it is expected that many or most particles will acquire a negative charge and be pulled away from the first electrode of the electrostatic precipitator, such as electrode 506 in FIG. 5. However, there may be some particles that have been stripped of their electrons or are neutrally charged that may be attracted to the negatively charged first electrode 506. Such particles may be deposited on the first electrode 506, reducing its efficiency and/or requiring periodic maintenance to clean first electrode 506. It is desirable that cleaning first electrode 506 be as automatic as possible, so that operating time is not lost and any exposure of workers to contaminants is minimized.

Figure 6:
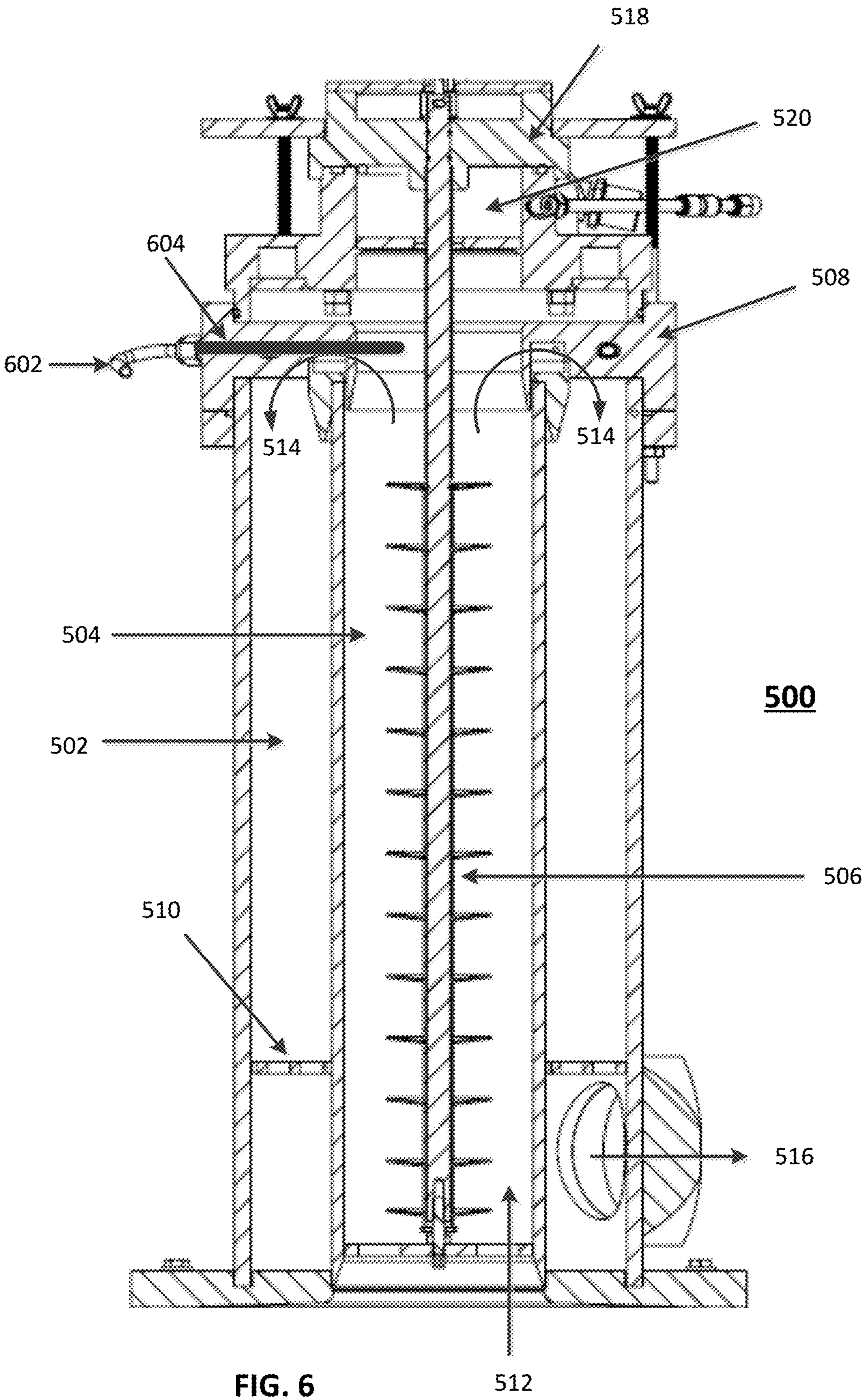
FIG. 6 is a cross-sectional view of an abatement apparatus including an electrostatic precipitator and a wet scrubber according to another embodiment.

To accomplish this, the electrostatic precipitator may be provided with a built in rinsing system which projects a liquid onto first electrode 506 so as to rinse away any material that has been so deposited. In one embodiment a single hole is used to direct a water stream to the top of first electrode 506 that rinses the accumulated material off of the central portion of first electrode 506 and then cascades down, sequentially rinsing the individual disc shaped elements 306. FIG. 6 shows the electrostatic precipitator 500 of FIG. 5, and now includes a water input 602 connected to a conduit 604 having an outlet hole within the electrostatic precipitator that may be used to provide a water stream to first electrode 506.

In other embodiments, a conduit with multiple outlet holes may be used; the holes may be aligned parallel to the longitudinal axis of first electrode 506, so as to rinse the entire electrode at once from multiple directions, or alternatively may rinse various sections of first electrode 506 sequentially from one or more directions. In still further embodiments, a spiral manifold with a plurality of water nozzles may be used; in some cases the spacing of the water nozzles may approximate the pitch of the disc shaped elements 306. Alternatively, a plurality of cylindrical or toroid shaped manifolds may be used. In light of the teachings herein, those of skill in the art will be able to determine which configuration will provide the best cleaning results in a given case.

The amount of water used to rinse first electrode 506 should be adequate to wash all of disc shaped elements 306, thus providing cleaning of all of first electrode 506. The water may be any water; for example, it could be fresh city water, scrubber sump water, or sump water or city water that has been treated with a cleaner. The cleaner may be acid based, alkaline, or may include a plurality of like or different chemicals or compounds or mixtures that speed the removal of deposits.

In various embodiments, the rinsing operation may be automated to occur at predetermined time intervals. In other embodiments, measured operating parameters of the system such as voltage, current, remaining particles after precipitation or other parameters, may indicate that performance of the electrostatic precipitator has fallen below some predetermined level, causing rinsing to occur. Alternatively, rinsing may be manually commenced. Those of skill in the art will appreciate many other control methods and techniques that may be used to control a rinse cycle.

It will be appreciated that the water used in rinsing can cause both shorting and/or an arc since the water stream provides a pathway to ground. This may be mitigated by decreasing the voltage to first electrode 506 during the rinsing operation, although this may also cause the particle scrubbing action of the electrostatic precipitator to decrease. Since the rinsing will preferably be of relatively short duration, the decrease in particle scrubbing action should not be excessive. Alternatively, the electrode power supply may be shut off allowing the rinse operation to proceed without a charge being supplied to the electrode.

In some embodiments, the rinse system will include a pressurized water supply and an automated shutoff valve. The water flow may be either variable or predetermined; depending upon the process type, a flow of 0.1 to 0.5 gallons per minute may be used, but higher flows may be necessary for certain types of deposited minerals. Rinsing type may be as short as 2 seconds or as long as several minutes, depending upon the chemistry of the rinsing water and the characteristics of the deposited material.

Once a rinse is completed, time may be provided to allow first electrode 506 to dry. Where first electrode 506 is on at reduced voltage during the rinse cycle, the voltage may be gradually increased as rinse water drips off first electrode 506. In higher voltage systems where power to first electrode 506 is turned off during rinsing, power may be turned on in as little as one second or as long as several minutes after rinsing is complete. In other embodiments, power may be pulsed during the drying time to cause droplets to be pushed off first electrode 506, although possibly with some resulting arcing. In still other embodiments, a hot nitrogen gas stream may be passed over first electrode 506 after rinsing to accelerate the drying time.

Lab results show such an electrostatic precipitator can reduce the particle matter coming from the abatement system by more than 99.9% of the original particle content of the gas. Current abatement systems produce particle output loads of 30 grams per hour or more depending on the makeup of the incoming gases. A reduction of the particle output load to less than 0.1 grams per hour has been measured by using this process.

Figure 7:
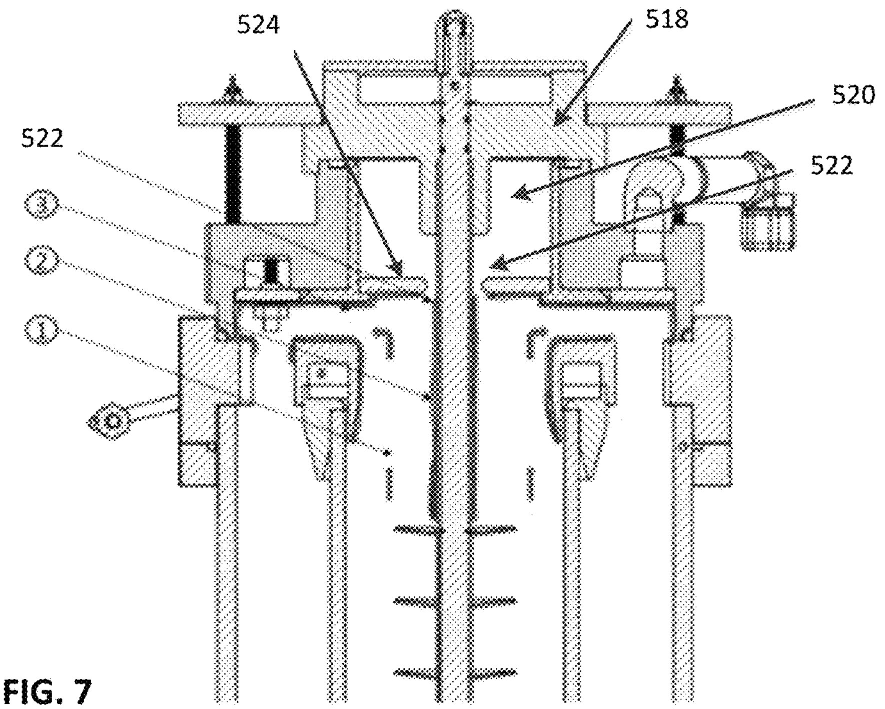
FIG. 7 is a close-up, cross-sectional view of the abatement apparatus including an electrostatic precipitator and a wet scrubber of according to the embodiments of FIGS. 5 and 6.

Referring now to FIG. 7, a close-up, cross-sectional view of the abatement apparatus including an electrostatic precipitator and a wet scrubber of the embodiments of FIGS. 5 and 6 is shown. In this close-up view, the high voltage power supply 518 to the electrostatic precipitator electrode 506 may pass through chamber 520 which, as was explained above with reference to FIG. 5, is filled with an inert gas, such as nitrogen (N2), or clean dry air (CDA).

Still referring to FIG. 7, as was also explained above with reference to FIG. 5, the gas or clean dry air in the chamber 520 is at a higher pressure than gas in the electrostatic precipitator and a small opening 522 is provided through or past barrier 524 between chamber 520 and the top of the electrostatic precipitator, and the pressure difference between the gas or clean dry air in chamber 520 and gas in the electrostatic precipitator allows the gas or clean dry air to flow only from chamber 520 into the electrostatic precipitator through opening 522, thus preventing accumulation of water and/or particles on the connection from high voltage power supply 518.

However, it has been determined that high current occurring due to electrical shorts developing over 4 to 6 weeks of operational run time of the electrostatic precipitator. Inspection data has revealed particle buildup on the surfaces of the gas path that create a possible electrical path for the electrode voltage from the high voltage power supply to reach ground. This high current causes arcing and low voltage which reduces overall particle efficiency and requires more frequent maintenance on the electrostatic precipitator.

Figure 8:
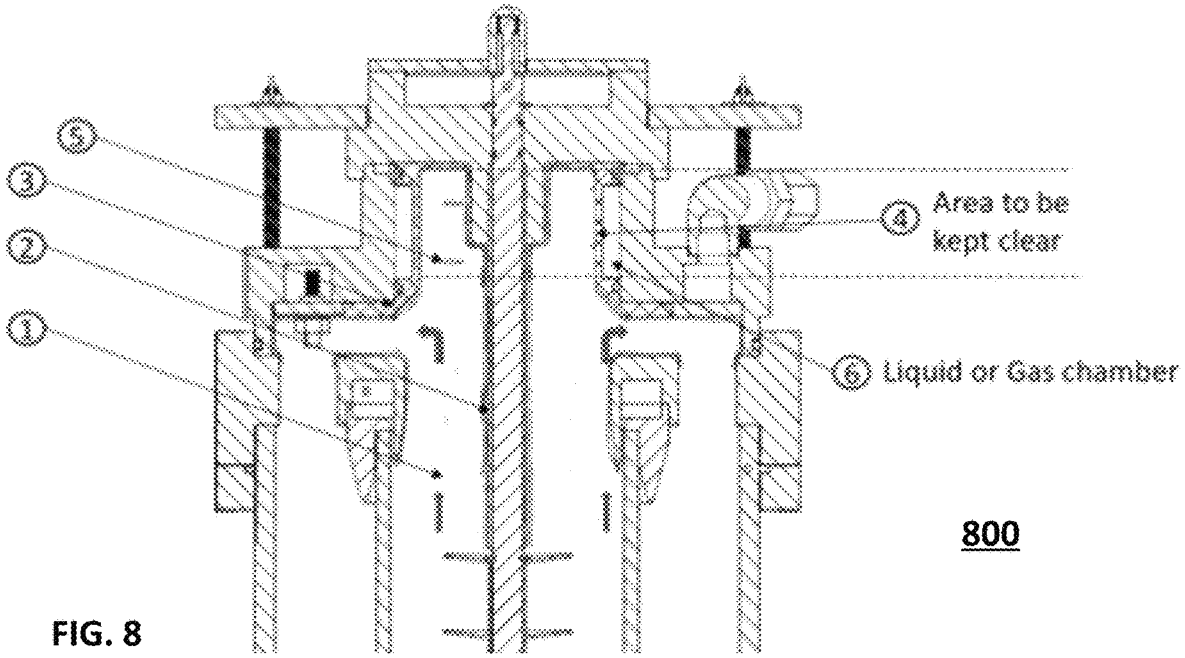
FIG. 8 is a close-up, cross-sectional view of the abatement apparatus including an electrostatic precipitator and a wet scrubber according to a further embodiment.

Referring now to FIG. 8 is a close-up, cross-sectional view of the abatement apparatus including an electrostatic precipitator and a wet scrubber according to a further embodiment that addresses this particle buildup. As can be seen by comparing this embodiment to that of FIG. 7, barrier 524 has been removed thus opening chamber 520 to the top of the electrostatic precipitator thereby creating one contiguous volume without physical separation. However, without more, opening chamber 520 to the top of the electrostatic precipitator exposes the high voltage power supply to particle buildup, which again creates a possible electrical path to reach ground.

Figure 9:
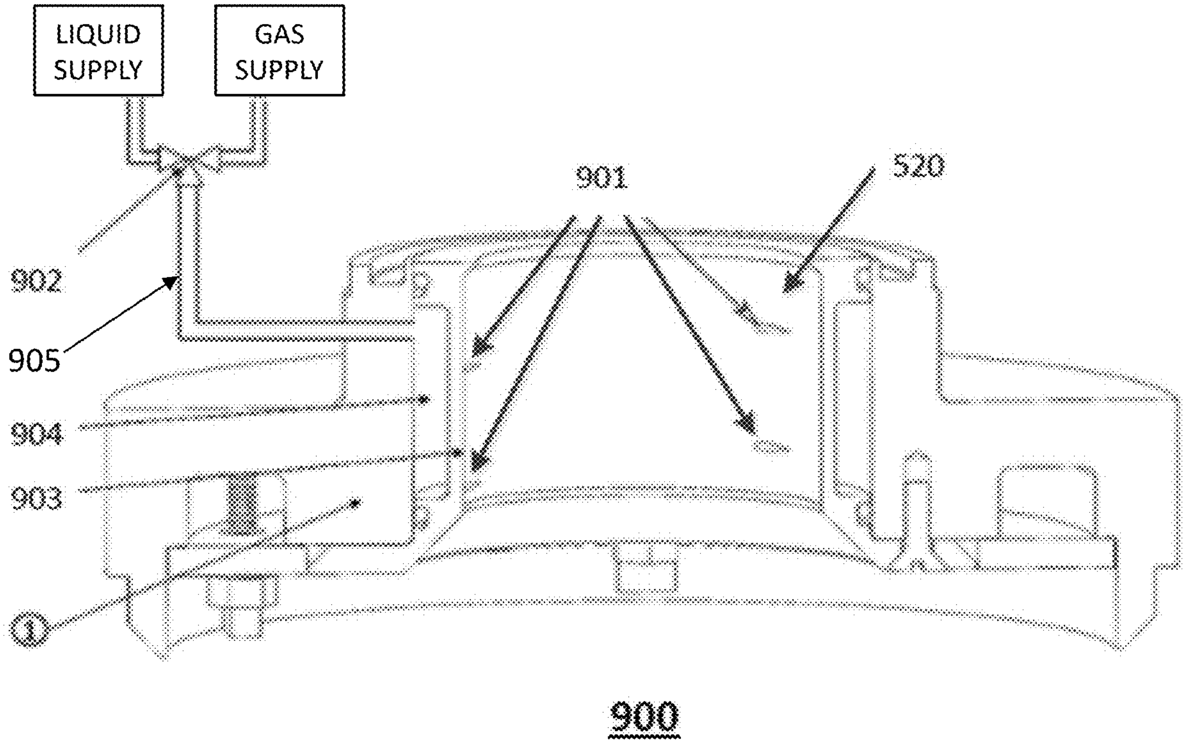
FIG. 9 is a close-up, cross-sectional view of the abatement apparatus including an electrostatic precipitator and a wet scrubber with further details according to the further embodiment of FIG. 8.

Referring now to FIG. 9 is a close-up, cross-sectional view of the abatement apparatus including an electrostatic precipitator and a wet scrubber with further details according to the further embodiment of FIG. 8. As shown in FIG. 9, chamber 520, again without barrier 524 existing between chamber 520 and the top of the electrostatic precipitator, is populated with a series of small holes or openings 901 configured in such a way to allow liquid and/or gas to flow over the interior walls of chamber 520. Holes 901 can be fed either a liquid or gas and can actively switch between them.

Figure 10:
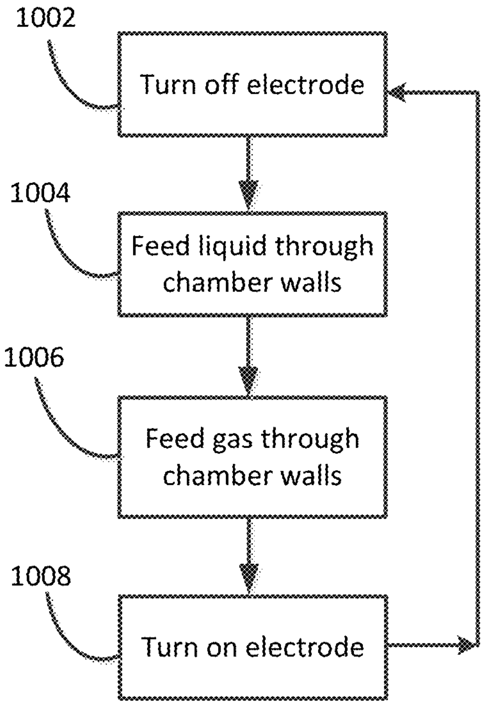
FIG. 10 illustrates several steps in an abatement process according to the further embodiment of FIGS. 8 and 9.

In one embodiment, walls of chamber 520 are periodically rinsed with a liquid via holes 901 for a predetermined period of time, e.g., for 30 seconds occurring every 3 hours of system operation (see, e.g., step 1004 of FIG. 10). The electrode can be turned off during this operation to prevent shorting the high voltage (see, e.g., step 1002 of FIG. 10). Then, after the predetermined period of time has elapsed, the liquid being fed through holes 901 is switched, via a diverter valve 902, back to a gas to evacuate the liquid and dry the walls of chamber 520 (see, e.g., step 1006 of FIG. 10) and the electrode is turned back on (see, e.g., step 1008 of FIG. 10). This process can then be repeated to keep the walls of chamber 520 clean and dry. In one embodiment, operation of these steps can be performed by liquid handling 108 of FIG. 1.

This further embodiment depicted in FIGS. 8 and 9, which embodiment does not have a barrier 524 between chamber 520 and the top of the electrostatic precipitator and utilizes periodic washing and drying of chamber 520 via holes 901 and a diverter valve 902, results in a significant reduction in particle buildup. Inspection data of this further embodiment has shown that chamber 520 was free of particle buildup and arcing after more than 16 weeks of operational use. This is a significant improvement over the embodiments of FIGS. 5 and 6 which, as explained above, experienced particle buildup and arcing within 4 to 6 weeks.

Still referring to FIG. 9, in one embodiment, holes 901 are 0.063 inches in diameter and are spaced all around the interior diameter of chamber 520. In a still further embodiment, the walls of chamber 520 are made from a Polytetrafluoroethylene (PTFE) insert 903 that creates a sealed gap 904 that encircles chamber 520 and is configured to receive the liquid and/or gas from a diverter valve 902 (controlled by a controller, not shown, and which can be part of liquid handling 108 of FIG. 1) and pass the liquid and/or gas through holes 901. Holes 901 are spaced to provide complete and uniform rinsing of the walls of chamber 520 whenever liquid is fed into sealed gap 904. In one embodiment, this uniformity is achieved by locating each hole 901 stepped up 0.35 inches from a previous hole 901 and rotated 120 degrees around the walls of chamber 520.

A line 905 connected between insert 903 and diverter valve 902 operates to receive and pass gas and/or liquid from diverter valve 902 to insert 903 so that the liquid and/or gas can pass through holes 901 into chamber 520 as has been described. In one embodiment, approximately 80 standard litres per minute (SLM) of nitrogen flow through holes 901 according to this arrangement thereby creating a vortex of nitrogen along the interior diameter or walls of chamber 520. This nitrogen flow helps keep particle material and moisture away from the walls of chamber 520. Then, also according to this embodiment, approximately every 3 hours, diverter valve 902 (again, operable via a controller, not shown) switches from nitrogen to water (H2O) for approximately 30 seconds. During this time, the water is fed through line 905, sealed gap 904, and holes 901 and the water rinses away any material that may have been deposited on the walls of chamber 520. After the 30 second water wash, diverter valve 902 switches back to nitrogen and the nitrogen will evacuate any water from line 905, sealed gap 904, and holes 901 and, further, will blow dry the walls of chamber 520. This keeps the walls of chamber 520 clean and dry thus preventing any potentially conductive material from causing a short between the high voltage feedthrough and the top part of the electrostatic chamber. In alternative embodiments, any appropriate liquid can be fed through line 905, sealed gap 904, and holes 901 to perform the rinse operation, including water dosed with a chemical. One of skill in the art, in light of the teachings herein, can determine what liquid is appropriate.

Figure 11:
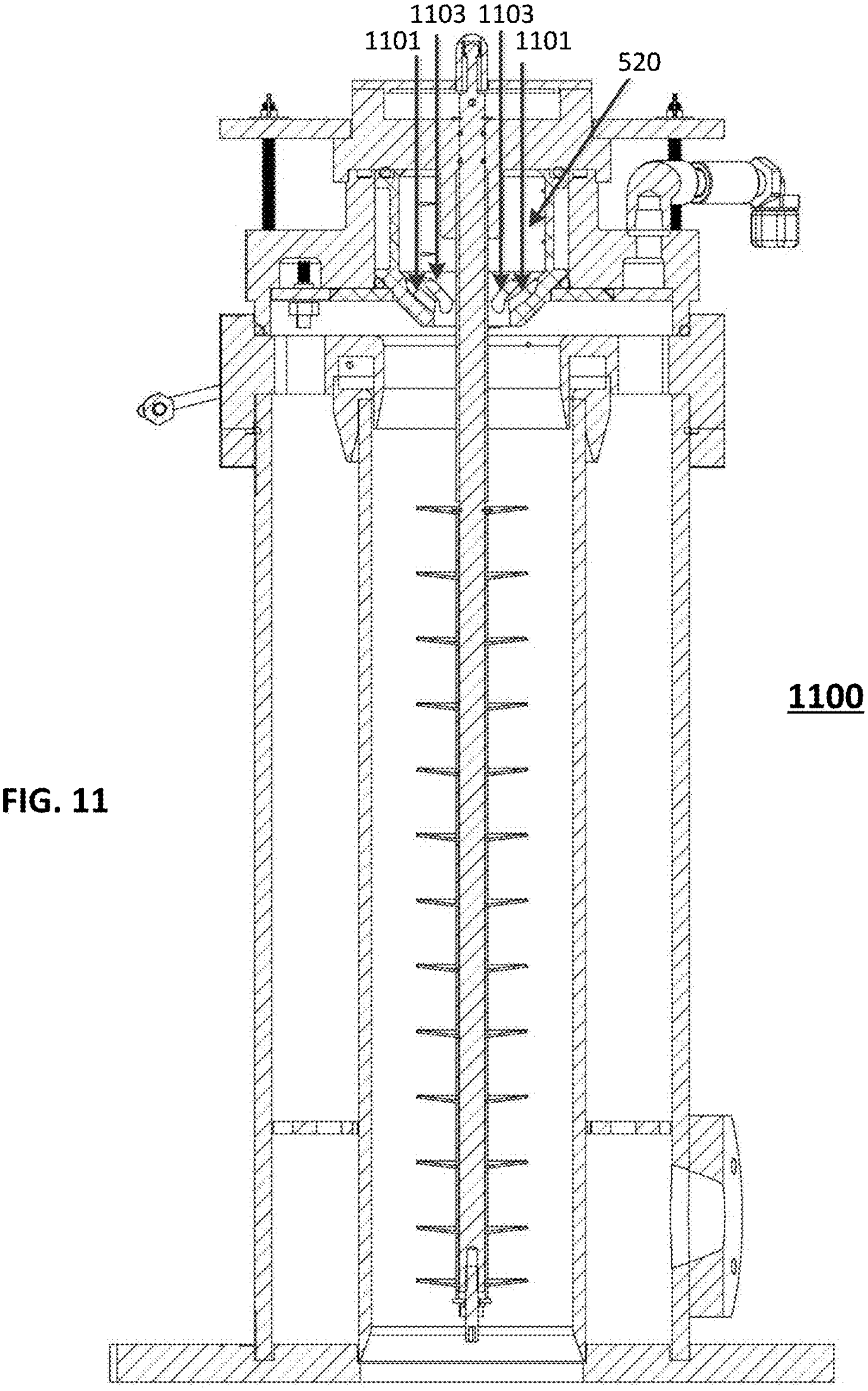
FIG. 11 is a cross-sectional view of the abatement apparatus including an electrostatic precipitator and a wet scrubber with further details according to the further embodiment of FIG. 8 and showing a still further embodiment.

Referring now to FIG. 11 is a cross-sectional view of the abatement apparatus including an electrostatic precipitator and a wet scrubber with further details according to the further embodiment of FIG. 8 and showing a still further embodiment. As shown in FIG. 11, chamber 520, again without barrier 524 existing between chamber 520 and the top of the electrostatic precipitator, now includes a lower, funnel-shaped structure 1101 configured to direct liquid from chamber 520 inwards towards the electrode. Directing the rinsing liquid towards the electrode serves to then wash the electrode in addition to the walls of chamber 520. In a yet further embodiment, the lower funnel-shaped structure 1101 further includes grooves 1103 which further serve to direct the rinsing liquid towards the electrode.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of the processes described herein may be altered without changing the overall result of the performance of all of the described processes, as well as the possible use of different types of air scrubbing systems.

For example, one of skill in the art will appreciate that wet scrubbers before or after an electrostatic precipitator may or may not have packing, may use different sources of water, such as water from the electrostatic precipitator, clean municipal water, etc., and may be irrigated in different ways, such as by a continuous stream of water, spray nozzles only, etc.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. It may be possible to incorporate some methods into hard-wired logic if desired. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An electrostatic precipitator including an electrode assembly, comprising:

an upper region configured to receive a high voltage feedthrough for the electrode assembly;

a lower region configured to operate as the electrostatic precipitator;

wherein the upper region and the lower region are configured as one contiguous volume without physical separation;

wherein an interior wall of the upper region has multiple openings configured to alternately receive a gas and a liquid;

wherein the electrostatic precipitator further comprises:

a diverter valve connected to a gas supply and a liquid supply; and a fluid line connecting the diverter valve to the multiple openings;

wherein the diverter valve is configured to control a flow of the liquid from the liquid supply through the fluid line to the multiple openings; and wherein the diverter valve is configured to control a flow of the gas from the gas supply through the fluid line to the multiple openings.

2. The electrostatic precipitator of claim 1, wherein each of the multiple openings are spaced around the interior wall of the upper region.

3. The electrostatic precipitator of claim 1, wherein the interior wall of the upper region is made from a Polytetrafluoroethylene (PTFE) insert.

4. The electrostatic precipitator of claim 1, wherein the gas is Nitrogen and the liquid is water.

5. The electrostatic precipitator of claim 1, wherein the upper region includes a lower, funnel-shaped structure.

6. The electrostatic precipitator of claim 5, wherein the lower, funnel- shaped structure includes grooves.

* * * * *